United States Patent
Yang

(10) Patent No.: US 10,136,279 B2
(45) Date of Patent: Nov. 20, 2018

(54) TERMINAL PERIPHERAL MANAGEMENT METHOD AND M2M GATEWAY

(71) Applicant: ZTE Corporation, Shenzhen, Guangdong (CN)

(72) Inventor: Kun Yang, Shenzhen (CN)

(73) Assignee: ZTE CORPORATION, Guangdong (CN)

( * ) Notice: Subject to any disclaimer, the term of this patent is extended or adjusted under 35 U.S.C. 154(b) by 3 days.

(21) Appl. No.: 14/759,614

(22) PCT Filed: Sep. 18, 2013

(86) PCT No.: PCT/CN2013/083826
§ 371 (c)(1),
(2) Date: Jul. 7, 2015

(87) PCT Pub. No.: WO2014/107976
PCT Pub. Date: Jul. 17, 2014

(65) Prior Publication Data
US 2015/0350809 A1    Dec. 3, 2015

(30) Foreign Application Priority Data
Jan. 11, 2013  (CN) .......................... 2013 1 0011266

(51) Int. Cl.
*H04W 4/38* (2018.01)
*H04W 4/50* (2018.01)
(Continued)

(52) U.S. Cl.
CPC ............. *H04W 4/38* (2018.02); *H04W 74/04* (2013.01); *H04W 4/50* (2018.02); *H04W 4/70* (2018.02)

(58) Field of Classification Search
CPC ...... H04W 4/006; H04W 74/04; H04W 4/005
See application file for complete search history.

(56) References Cited

U.S. PATENT DOCUMENTS

2009/0070447 A1    3/2009  Jubinville
2011/0072178 A1    3/2011  Mace
(Continued)

FOREIGN PATENT DOCUMENTS

CN    102023890 A    4/2011
CN    102223729 A    10/2011
(Continued)

OTHER PUBLICATIONS

International Search Report in international application No. PCT/CN2013/083826, dated Dec. 26, 2013.
(Continued)

*Primary Examiner* — Vladimir Magloire
*Assistant Examiner* — Donald H B Braswell
(74) *Attorney, Agent, or Firm* — Neifeld IP Law, PC

(57) ABSTRACT

Provided is a method for managing a terminal peripheral, including that an M2M gateway obtains a policy definition of an event, and obtains, from the policy definition of the event, an operation priority indication corresponding to an operation in the event; and when the event is triggered by the M2M gateway and if it is determined that an operation of the same type as the operation in the event exists in a corresponding terminal peripheral, whether to deliver the operation in the event to the corresponding terminal peripheral is decided according to the operation priority indication in the policy definition of the event and a priority judgment policy. An M2M gateway is also provided. Processing priorities of operations of the same type can be determined according to priority indications of the operations by adopting the present disclosure, thereby avoiding operation conflict and system error reporting occurring on a terminal peripheral, and improving the efficiency of an M2M gateway in managing a terminal peripheral or a terminal peripheral group.

12 Claims, 1 Drawing Sheet

(51) Int. Cl.
*H04W 4/70* (2018.01)
*H04W 74/04* (2009.01)

(56) References Cited

U.S. PATENT DOCUMENTS

| | | |
|---|---|---|
| 2011/0213871 A1 | 9/2011 | Digirolamo |
| 2012/0117140 A1* | 5/2012 | Wang ............... H04W 4/005 709/201 |
| 2012/0294146 A1 | 11/2012 | Wu |
| 2012/0327945 A1 | 12/2012 | Li |
| 2013/0007278 A1* | 1/2013 | Srinivasan ......... H04W 4/005 709/225 |

FOREIGN PATENT DOCUMENTS

| | | |
|---|---|---|
| CN | 102264087 A | 11/2011 |
| CN | 103781100 A | 5/2014 |
| EP | 2536100 A1 | 12/2012 |
| KR | 20100084911 A | 7/2010 |
| WO | 2009030027 A1 | 3/2009 |

OTHER PUBLICATIONS

English Translation of the Written Opinion of the International Search Authority in international application No. PCT/CN2013/083826, dated Dec. 26, 2013.

Supplementary European Search Report in European application No. 13870817.7, dated Nov. 2, 2015.

Machine-to-Machine communications (M2M); M2M service requiremen, mailed on Oct. 23, 2009.

\* cited by examiner

TERMINAL PERIPHERAL MANAGEMENT METHOD AND M2M GATEWAY

CROSS REFERENCE TO RELATED APPLICATIONS

This application is a national stage entry of PCT/CN2013/083826, filed Sep. 18, 2013, which published as WO 2014/107976 in a language other than English on Jul. 17, 2014, which claims priority to Chinese Application No. 201310011266.1, filed Jan. 11, 2013; and these applications are incorporated herein by reference.

TECHNICAL FIELD

The present disclosure relates to a Machine-to-Machine/Man (M2M) technology in the field of mobile communications, and particularly to a terminal peripheral management method and an M2M gateway.

BACKGROUND

At present, a terminal peripheral in an M2M stub network is managed via an M2M gateway in an M2M communication system, including that: the M2M gateway configures an event defined by a policy; when determining to execute the event according to an event trigger condition, the M2M gateway delivers an operation defined in the event to a corresponding terminal peripheral or a terminal peripheral group and receives operation execution information returned by the terminal peripheral or the terminal peripheral group.

However, the aforementioned method for an M2M gateway to manage a terminal peripheral is only capable of delivering operations to a corresponding terminal peripheral or terminal peripheral group according to a triggering sequence of all events, but fails to determine, according to a current operation of the terminal peripheral or the terminal peripheral group, whether to deliver an operation of the same type to the corresponding terminal peripheral or the terminal peripheral group. Thus operation conflict and system error reporting may occur on the terminal peripheral or the terminal peripheral group, thereby further affecting the efficiency of the M2M gateway in managing the terminal peripheral or the terminal peripheral group.

Thus, a method for an M2M gateway to manage a terminal peripheral in the prior art fails to avoid operation conflict and system error reporting occurring on a terminal peripheral and thus further affects the efficiency of the M2M gateway in managing the terminal peripheral or a terminal peripheral group.

SUMMARY

In view of this, a purpose of the present disclosure is to provide a method for managing a terminal peripheral and to provide an M2M gateway, so that priorities for processing operations of the same type can be determined according to priority indications of the operations, thus avoiding operation conflict on a terminal peripheral and system error reporting, and improving the efficiency of the M2M gateway in managing a terminal peripheral or a terminal peripheral group.

To achieve the foregoing purpose, technical solutions of embodiments of the present disclosure are implemented by the following way.

An embodiment of the present disclosure provides a method for managing a terminal peripheral. An M2M gateway obtains a policy definition of an event, and obtains from the policy definition of the event, an operation priority indication corresponding to an operation in the event. The method further may include that:

when the event is triggered by the M2M gateway and if it is determined that an operation of the same type as the operation in the event exists on a corresponding terminal peripheral, whether to deliver the operation in the event to the corresponding terminal peripheral is decided according to the operation priority indication in the policy definition of the event and a priority judgment policy.

In the foregoing solution, the operation that the policy definition of the event is obtained may include that an M2M service platform delivers the policy definition of the event to the M2M gateway, or the policy definition of the event is configured on the M2M gateway.

In the foregoing solution, before it is determined that the operation of the same type as the operation in the event exists on the corresponding terminal peripheral, the method further may include that whether the operation of the same type as the operation in the event exists in the corresponding terminal peripheral is judged;

wherein the judgement may include that whether a current operation exists on a corresponding terminal peripheral or terminal peripheral group is detected locally according to an identifier of a terminal peripheral or a terminal peripheral group of the operation in the event; if the operation exists, then an operation type is extracted from the current operation, the operation type is compared with an operation type corresponding to the operation in the event; if the two operation types are consistent, then the two operations are of the same type, otherwise, the two operations are of different types;

if the current operation does not exist, then it is determined that the two operations are of different types.

In the foregoing solution, the operation that whether to deliver the operation in the event to the corresponding terminal peripheral is decided according to the operation priority indication in the policy definition of the event and the priority judgment policy may include that:

the M2M gateway retrieves, according to a current operation of a terminal peripheral or a terminal peripheral group corresponding to the operation in the event existing on the M2M gateway, an operation priority indication corresponding to the current operation from the policy definition of the event; and whether to deliver the operation in the event to the corresponding terminal peripheral or terminal peripheral group is determined according to the priority judgment policy and by virtue of the operation priority indication corresponding to the current operation and the operation priority indication corresponding to the operation in the event.

In the foregoing solution, the priority judgment policy may include that:

whether the operation priority indication corresponding to the operation in the event is not higher than an operation priority indication corresponding to a current operation is judged; if not higher, then the operation in the event is dropped and a terminal peripheral or a terminal peripheral group continues executing the current operation;

if higher, then the current operation is replaced by the operation in the event, and the operation in the event is delivered according to an identifier of the terminal peripheral or the terminal peripheral group of the operation in the event.

In the foregoing solution, the priority judgment policy may include that:

whether the operation priority indication corresponding to the operation in the event is not lower than an operation priority indication corresponding to a current operation is judged; if not lower, then the current operation is replaced by the operation in the event, and the operation in the event is delivered according to an identifier of a terminal peripheral or a terminal peripheral group of the operation in the event;

otherwise, the operation in the event is dropped, and the terminal peripheral or the terminal peripheral group continues to perform the current operation.

An embodiment of the present disclosure further provides an M2M gateway. The M2M gateway includes a management module and a priority judgement module, wherein the management module is configured to obtain a policy definition of an event, and obtain from the policy definition of the event, an operation priority indication corresponding to an operation in the event; and configured to, when the event is triggered and if it is determined that an operation of the same type as the operation in the event exists on a corresponding terminal peripheral, send the operation priority indication in the policy definition of the event to the priority judgement module; and the priority judgement module is configured to decide, according to a priority judgment policy and the operation priority indication in the policy definition of the event from the management module, whether the operation in the event is delivered to the corresponding terminal peripheral.

In the foregoing solution, the management module may be configured to receive from an M2M service platform the policy definition of the event or configure the policy definition of the event locally.

In the foregoing solution, the management module may be configured to judge whether the operation of the same type as the operation in the event exists on the corresponding terminal peripheral, wherein the judgement may include whether a current operation exists on a corresponding terminal peripheral or terminal peripheral group is detected locally according to an identifier of a terminal peripheral or a terminal peripheral group of the operation in the event; if the operation exists, an operation type is extracted from the current operation, and the operation type is compared with an operation type corresponding to the operation in the event; if the two operation types are consistent, then the two operations are determined to be of the same type, otherwise, the two operations are determined to be of different types; if the current operation does not exist, then it is determined that the two operations are of different types.

In the foregoing solution, the priority judgement module may be configured to retrieve according to a current operation of a terminal peripheral or a terminal peripheral group corresponding to the operation in the event existing on the M2M gateway, an operation priority indication corresponding to the current operation from the policy definition obtained by the management module; determine, according to the priority judgment policy and by virtue of the operation priority indication corresponding to the current operation and the operation priority indication corresponding to the operation in the event, whether to deliver the operation in the event to the corresponding terminal peripheral or terminal peripheral group;

accordingly, the management module may be configured to provide the operation priority indication corresponding to the current operation for the priority judgement module.

In the foregoing solution, the priority judgement module is configured to execute the priority judgement policy;

wherein the priority judgment policy may include that whether the operation priority indication corresponding to the operation in the event is not higher than an operation priority indication corresponding to a current operation is judged; if not higher, then the operation in the event is dropped; and a terminal peripheral or a terminal peripheral group continues executing the current operation; if higher, then the current operation is replaced by the operation in the event, and the operation in the event is delivered according to an identifier of the terminal peripheral or the terminal peripheral group of the operation in the event.

In the foregoing solution, the priority judgement module may be configured to execute the priority judgement policy;

the priority judgment policy may include that whether the operation priority indication corresponding to the operation in the event is not lower than an operation priority indication corresponding to a current operation is judged; if not lower, then the current operation is replaced by the operation in the event, and the operation in the event is delivered according to an identifier of a terminal peripheral or a terminal peripheral group of the operation in the event; if lower, then the operation in the event is dropped, and the terminal peripheral or the terminal peripheral group continues executing the current operation.

An M2M gateway and a method for managing a terminal peripheral according to the embodiments of the present disclosure are able to obtain a policy definition of an event, and obtain from the policy definition of the event, an operation priority indication corresponding to an operation in the event; and when the event is triggered and if it is determined that an operation of the same type as the operation in the event exists on a corresponding terminal peripheral, whether the operation in the event is delivered to the corresponding terminal peripheral is decided according to the operation priority indication in the policy definition of the event and a priority judgment policy. In this way, whether delivery of the operation of the same type to the terminal peripheral is determined in combination with a current operation situation of the terminal peripheral, thus ensuring that operation conflict and system error reporting occurring on a terminal peripheral can be avoided and improving the efficiency of the M2M gateway in managing a terminal peripheral or a terminal peripheral group.

DETAILED DESCRIPTION

The basic idea of the embodiments of the present disclosure is that an M2M gateway obtains a policy definition of an event, and obtains, from the policy definition of the event, an operation priority indication corresponding to an operation in the event; and when the event is triggered by the M2M gateway and if it is determined that an operation of the same type as the operation in the event exists on a corresponding terminal peripheral, whether the operation in the event is delivered to the corresponding terminal peripheral is decided according to the operation priority indication in the policy definition of the event and a priority judgment policy.

The present disclosure will be further expounded hereinafter in combination with the accompanying drawings and specific embodiments.

Figure 1:
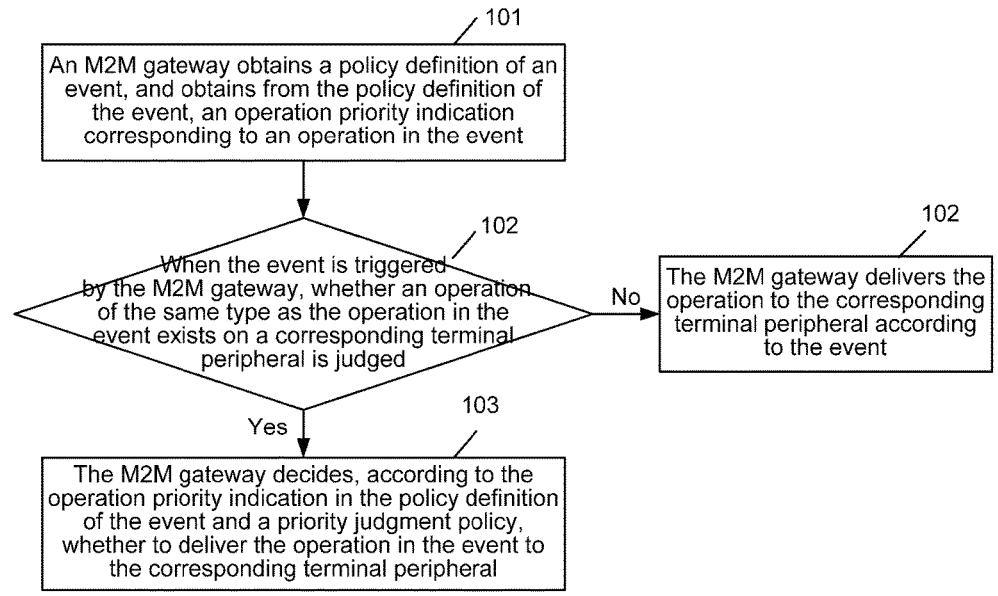
FIG. 1 is a flowchart of a method for managing a terminal peripheral according to an embodiment of the present disclosure.

As shown in FIG. 1, a method for managing a terminal peripheral according to an embodiment of the present disclosure includes the following steps.

Step 101 is that an M2M gateway obtains a policy definition of an event, and obtains from the policy definition of the event, an operation priority indication corresponding to an operation in the event.

Here, the event is a group of associated operations directed to terminal peripherals by the M2M gateway. The operation may include an identifier of a terminal peripheral or a terminal peripheral group, operation information, and an operation priority indication corresponding to the operation. The operation information may include an operation type and operation content. The operation priority indication may be a parameter preset according to a practical condition.

The operation that the policy definition of the event is obtained may include that an M2M service platform delivers the policy definition of the event to the M2M gateway, or the policy definition of the event is configured on the M2M gateway, including one or more events, and a trigger condition of each event.

A trigger condition of the event is a condition that the M2M gateway needs to satisfy when executing an operation directed to a terminal peripheral. For example, the trigger condition may be a time value directed to a system time or a timer, a data value of one or more monitor data directed to a terminal peripheral and/or a terminal peripheral group, a state value of one or more running states directed to a terminal peripheral and/or a terminal peripheral group.

Step 102 is that when the event is triggered by the M2M gateway, whether an operation of the same type as the operation in the event exists on a corresponding terminal peripheral is judged. If such an operation exists, Step 103 is performed, otherwise, the M2M gateway delivers the operation to the corresponding terminal peripheral according to the event, and the process is terminated.

Here, triggering the event by the M2M gateway belongs to the prior art and will not be described repeatedly here.

The operation that whether the operation of the same type as the operation in the event exists on a corresponding terminal peripheral is judged may include that: whether a current operation exists on a corresponding terminal peripheral or terminal peripheral group is detected locally according to an identifier of a terminal peripheral or a terminal peripheral group corresponding to the operation in the event; if the current operation exists, an operation type is extracted from the current operation, the operation type is compared with an operation type corresponding to the operation in the event; if the two operations are consistent, the two operations are determined to be of the same type, otherwise, the two operations are determined to be of different types; if the current operation does not exist, it is determined that the two operations are of different types.

Delivering the operation to the terminal peripheral corresponding to the event by the M2M gateway belongs to the prior art and will not be described repeatedly here.

Step 103 is that the M2M gateway decides, according to the operation priority indication in the policy definition of the event and a priority judgment policy, whether to deliver the operation in the event to the corresponding terminal peripheral.

Specifically, the M2M gateway retrieves, according to a current operation of a terminal peripheral or a terminal peripheral group corresponding to the operation in the event existing on the M2M gateway, an operation priority indication corresponding to the current operation from the policy definition of the event. Whether to deliver the operation in the event to the corresponding terminal peripheral or terminal peripheral group is determined according to the priority judgment policy and by virtue of the operation priority indication corresponding to the current operation and the operation priority indication corresponding to the operation in the event.

Here, the priority judgment policy is that whether the operation priority indication corresponding to the operation in the event is not higher than the operation priority indication corresponding to the current operation is judged; if not higher, the operation in the event is dropped and the terminal peripheral or the terminal peripheral group continues executing the current operation; if higher, the current operation is replaced by the operation in the event, and the operation in the event is delivered according to the identifier of the terminal peripheral or the terminal peripheral group of the operation in the event.

Or the priority judgment policy is that whether the operation priority indication corresponding to the operation in the event is not lower than the operation priority indication corresponding to the current operation is judged; if not lower, the current operation is replaced by the operation in the event, and the operation in the event is delivered according to the identifier of the terminal peripheral or the terminal peripheral group of the operation in the event; if lower, the operation in the event is dropped, and the terminal peripheral or the terminal peripheral group continues executing the current operation.

Preferably, after Step 103 is completed, the M2M gateway may further receive operation execution information returned by the terminal peripheral or the terminal peripheral group, delete an operation corresponding to a corresponding terminal peripheral or terminal peripheral group and record operation execution information, wherein the operation execution information may include an identifier of the terminal peripheral or an identifier of the terminal peripheral group, an indication of an operation execution success or failure, a state value obtained after execution of an operation succeeds, or a reason value obtained after the execution of the operation fails.

Figure 2:
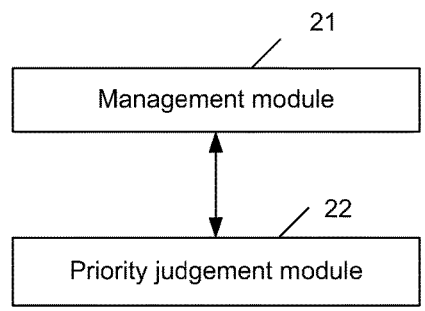
FIG. 2 is a schematic diagram of structure of an M2M gateway according to an embodiment of the present disclosure.

As shown in FIG. 2, an embodiment of the present disclosure provides an M2M gateway. The M2M gateway includes a management module 21 and a priority judgement module 22, wherein the management module 21 is configured to obtain a policy definition of an event, and obtain from the policy definition of the event, an operation priority indication corresponding to an operation in the event; when the event is triggered and if it is determined that an operation of the same type as the operation in the event exists in a corresponding terminal peripheral, send the operation priority indication in the policy definition of the event to the priority judgement module 22; and the priority judgement module 22 is configured to decide, according to a priority judgment policy and the operation priority indication in the policy definition of the event from the management module 21, whether to deliver the operation in the event to the corresponding terminal peripheral.

The management module 21 is configured to obtain a group of associated operations directed to terminal peripherals as the event, wherein the operation may include an identifier of a terminal peripheral or a terminal peripheral group, operation information, and an operation priority indication corresponding to the operation. The operation information may include an operation type and operation content.

The management module 21 is configured to receive from an M2M service platform the policy definition of the event or directly configure the policy definition of the event locally.

The management module 21 is configured to, when the event is triggered, judge whether the operation of the same type as the operation in the event exists on the corresponding terminal peripheral; if such an operation exists, send the operation priority indication in the policy definition of the event to the priority judgement module 22, otherwise, deliver the operation to the corresponding terminal peripheral.

The management module 21 is configured to locally detect, according to an identifier of a terminal peripheral or a terminal peripheral group of the operation in the event, whether a current operation exists on a corresponding terminal peripheral or terminal peripheral group; if the current operation exists, extract an operation type from the current operation, compare the operation type with an operation type corresponding to the operation in the event; if the two operations are consistent, the two operations are determined to be of the same type, otherwise, the two operations are determined to be of different types; and if the current operation does not exist, it is determined that the two operations are of different types.

The priority judgement module 22 is configured to retrieve, according to a current operation of a terminal peripheral or a terminal peripheral group sent by the management module 21, an operation priority indication corresponding to the current operation from the policy definition obtained by the management module 21; determine whether to deliver the operation in the event to the corresponding terminal peripheral or terminal peripheral group according to the priority judgment policy and by virtue of the operation priority indication corresponding to the current operation and the operation priority indication corresponding to the operation in the event from the management module 21. Accordingly, the management module 21 is configured to provide the priority judgement module 22 with the local current operation of the terminal peripheral or the terminal peripheral group corresponding to the operation in the event, the operation priority indication corresponding to the operation, and the operation priority indication corresponding to the operation in the triggered event.

The priority judgement module 22 is configured to execute the priority judgement policy;

wherein the priority judgment policy may include that whether the operation priority indication corresponding to the operation in the event is not higher than the operation priority indication corresponding to the current operation is judged; if not higher, the operation in the event is dropped, and the terminal peripheral or the terminal peripheral group continues executing the current operation; otherwise, the current operation is replaced by the operation in the event, and the operation in the event is delivered according to the identifier of the terminal peripheral or the terminal peripheral group of the operation in the event.

Or the priority judgment policy may include that whether the operation priority indication corresponding to the operation in the event is not lower than the operation priority indication corresponding to the current operation is judged; if not lower, the current operation is replaced by the operation in the event, and the operation in the event is delivered according to the identifier of the terminal peripheral or the terminal peripheral group of the operation in the event; otherwise, the operation in the event is dropped, and the terminal peripheral or the terminal peripheral group continues executing the current operation.

The management module 21 is configured to receive operation execution information returned by the terminal peripheral or the terminal peripheral group, delete an operation corresponding to a corresponding terminal peripheral or terminal peripheral group and record operation execution information, wherein the operation execution information may include an identifier of the terminal peripheral or an identifier of the terminal peripheral group, an indication of an operation execution success or failure, a state value obtained after execution of an operation succeeds, or a reason value obtained after the execution of the operation fails.

The management module 21 and the priority judgement module 22 may be implemented by a Digital Signal Processor (DSP) in the M2M gateway.

The above are only preferred embodiments of the present disclosure, but are not used for limiting the protection scope of the present disclosure.

What is claimed is:

1. A method for managing a terminal peripheral, comprising: obtaining, by a Machine-to-Machine/Man (M2M) gateway, a policy definition of an event, and obtaining from the policy definition of the event, by the M2M gateway, an operation priority indication corresponding to an operation in the event; and the method further comprising:
   when the event is triggered by the M2M gateway and if it is determined that an operation to be executed by a corresponding terminal peripheral, which is of the same type as the operation in the event exists for the same corresponding terminal peripheral, deciding, according to the operation priority indication in the policy definition of the event and a priority judgment policy, whether to deliver the operation in the event to the corresponding terminal peripheral, wherein the deciding according to the priority judgment policy comprises:
      judging whether the operation priority indication corresponding to the operation in the event is not lower than an operation priority indication corresponding to a current operation;
      if not lower, then replacing the current operation by the operation in the event, and delivering the operation in the event according to an identifier of a terminal peripheral or a terminal peripheral group of the operation in the event;
      if lower, then dropping the operation in the event, and continuing executing, by the terminal peripheral or the terminal peripheral group, the current operation;
   receiving operation execution information returned by the terminal peripheral or the terminal peripheral group;
   deleting the operation in the event and the current operation corresponding to the terminal peripheral or the terminal peripheral group; and
   recording the operation execution information, wherein the operation execution information includes an identifier of the terminal peripheral which returns the operation execution information or the terminal peripheral group which returns operation execution information, an indication of an operation execution success or failure, a state value obtained after execution of an operation succeeds, or a reason value obtained after the execution of the operation fails.

2. The method according to claim 1, wherein obtaining the policy definition of the event comprises: delivering, by an M2M service platform, the policy definition of the event to the M2M gateway, or configuring the policy definition of the event on the M2M gateway.

3. The method according to claim 1, before deciding, according to the operation priority indication in the policy definition of the event and a priority judgment policy, whether to deliver the operation in the event to the corresponding terminal peripheral, the method further comprising: judging whether the operation of the same type as the operation in the event exists;

wherein the judgement comprises: locally detecting, according to an identifier of a terminal peripheral or a terminal peripheral group of the operation in the event, whether a current operation exists; if the operation exists, then extracting an operation type from the current operation, and comparing the operation type with an operation type corresponding to the operation in the event; if the two operation types are consistent, then determining that the two operations are of the same type, otherwise, the two operations are of different types;

if the current operation does not exist, then determining that the two operations are of different types.

4. The method according to claim 1, wherein the operation in the event comprises: an operation type and operation content.

5. The method according to claim 1, wherein the deciding according to the priority judgment policy further comprises:

retrieving, by the M2M gateway according to a current operation of a terminal peripheral or a terminal peripheral group corresponding to the operation in the event, an operation priority indication corresponding to the current operation from the policy definition of the event.

6. The method according to claim 5, wherein the operation in the event comprises: an operation type and operation content.

7. A Machine-to-Machine/Man (M2M) gateway, comprising a memory for storing programming instructions and a processor, wherein the processor is configured to be capable of executing the stored programming instructions to perform steps comprising:

obtaining a policy definition of an event, and obtain from the policy definition of the event, an operation priority indication corresponding to an operation in the event; and when the event is triggered and if it is determined that an operation to be executed by a corresponding terminal peripheral, which is of the same type as the operation in the event is intended to be delivered, already has an operation to be executed exists for the same corresponding terminal peripheral, deciding, according to a priority judgment policy and the operation priority indication in the policy definition of the event, whether to deliver the operation in the event to the corresponding terminal peripheral, wherein the deciding according to the priority judgment policy comprises:

judging whether the operation priority indication corresponding to the operation in the event is not lower than an operation priority indication corresponding to a current operation;

if not lower, then replacing the current operation by the operation in the event, and delivering the operation in the event according to an identifier of a terminal peripheral or a terminal peripheral group of the operation in the event;

if lower, then dropping the operation in the event, and continuing executing, by the terminal peripheral or the terminal peripheral group, the current operation;

receiving operation execution information returned by the terminal peripheral or the terminal peripheral group;

deleting the operation in the event and the current operation corresponding to the terminal peripheral or the terminal peripheral group; and recording the operation execution information, wherein the operation execution information includes an identifier of the terminal peripheral which returns the operation execution information or the terminal peripheral group which returns operation execution information, an indication of an operation execution success or failure, a state value obtained after execution of an operation succeeds, or a reason value obtained after the execution of the operation fails.

8. The M2M gateway according to claim 7, the processor is configured to be capable of executing the stored programming instructions to perform steps comprising:

receiving from an M2M service platform the policy definition of the event or configuring the policy definition of the event locally.

9. The M2M gateway according to claim 7, the processor is configured to be capable of executing the stored programming instructions to perform steps further comprising:

judging whether the operation, which is of the same type as the operation in the event, exists;

wherein the judgement comprises: locally detecting, according to an identifier of a terminal peripheral or a terminal peripheral group of the operation in the event, whether a current operation exists; if the operation exists, then extracting an operation type from the current operation, and comparing the operation type with an operation type corresponding to the operation in the event; if the two operation types are consistent, then determining that the two operations are of the same type, otherwise, the two operations are of different types; if the current operation does not exist, then determining that the two operations are of different types.

10. The M2M gateway according to claim 7, wherein the operation in the event comprises: an operation type and operation content.

11. The M2M gateway according to claim 7, the processor is configured to be capable of executing the stored programming instructions to perform steps further comprising:

retrieving according to a current operation of a terminal peripheral or a terminal peripheral group corresponding to the operation in the event, an operation priority indication corresponding to the current operation from the policy definition.

12. The M2M gateway according to claim 11, wherein the operation in the event comprises: an operation type and operation content.

* * * * *